(12) United States Patent
Dowd et al.

(10) Patent No.: US 9,816,619 B2
(45) Date of Patent: Nov. 14, 2017

(54) THRUST PLATE FOR BUTTERFLY VALVE

(75) Inventors: Peter J. Dowd, Granby, CT (US); John M. Dehais, Windsor, CT (US); Blair A. Smith, South Windsor, CT (US); Timothy R. Boysen, Simsbury, CT (US); Keith J. Brooky, Wallingford, CT (US); Aaron T. Nardi, East Granby, CT (US); Kevin M. Rankin, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1594 days.

(21) Appl. No.: 13/007,850

(22) Filed: Jan. 17, 2011

(65) Prior Publication Data
US 2012/0181469 A1 Jul. 19, 2012

(51) Int. Cl.
*F16K 1/22* (2006.01)
*F16K 27/02* (2006.01)

(52) U.S. Cl.
CPC ............. *F16K 1/225* (2013.01); *F16K 1/22* (2013.01); *F16K 27/0218* (2013.01); *Y10T 29/49412* (2015.01)

(58) Field of Classification Search
CPC .............................. F16K 1/22; F16K 27/0218
USPC ......... 251/304–308; 384/240, 243–245, 912, 384/913
See application file for complete search history.

(56) References Cited

U.S. PATENT DOCUMENTS

| | | | | |
|---|---|---|---|---|
| 144,067 | A | * | 10/1873 | Crocker ..................... 384/240 |
| 2,361,962 | A | | 11/1944 | Ronay |
| 2,934,312 | A | * | 4/1960 | Stevens ..................... 251/283 |
| 3,508,737 | A | * | 4/1970 | Sikorcin .................... 251/306 |
| 4,103,866 | A | * | 8/1978 | Robinson .................. 251/151 |
| 4,237,362 | A | | 12/1980 | Arnoldy |
| 4,247,079 | A | * | 1/1981 | Friess ........................ 251/174 |
| 4,725,508 | A | * | 2/1988 | Rangaswamy et al. ...... 428/570 |
| 4,837,417 | A | | 6/1989 | Funk |
| 5,051,112 | A | | 9/1991 | Keshavan et al. |
| 6,034,344 | A | | 3/2000 | Ittleson et al. |
| 6,048,171 | A | | 4/2000 | Donnelly et al. |
| 6,082,291 | A | | 7/2000 | Ittleson et al. |
| 6,090,497 | A | | 7/2000 | Mori et al. |
| 6,156,391 | A | | 12/2000 | Shum et al. |
| 6,186,508 | B1 | | 2/2001 | Zajchowski et al. |
| 6,649,682 | B1 | * | 11/2003 | Breton et al. ............... 524/404 |

(Continued)

FOREIGN PATENT DOCUMENTS

CN 2474831 1/2002
CN 2489153 5/2002

(Continued)

OTHER PUBLICATIONS

U.S. Appl. No. 12/940,558, filed Nov. 5, 2010.

(Continued)

*Primary Examiner* — Mary McManmon
*Assistant Examiner* — Hailey K Do
(74) *Attorney, Agent, or Firm* — Carlson, Gaskey & Olds, P.C.

(57) ABSTRACT

A thrust plate for a butterfly valve includes a thrust plate body that defines a recess. The recess extends between a bottom thrust surface, side walls and an open top. A wear-resistant coating is located on the bottom thrust surface.

24 Claims, 2 Drawing Sheets

(56) References Cited

U.S. PATENT DOCUMENTS

| | | |
|---|---|---|
| 6,888,088 B2 | 5/2005 | Bolton et al. |
| 7,361,411 B2 | 4/2008 | Daemen et al. |
| 2012/0007008 A1* | 1/2012 | Hegner et al. ............... 251/305 |

FOREIGN PATENT DOCUMENTS

| | | | | |
|---|---|---|---|---|
| CN | 2615448 | | 5/2004 | |
| DE | 20091014140 | * | 3/2009 | ............... F02D 9/04 |

OTHER PUBLICATIONS

Armco Nitronic 60—Data on World Wide Metals and Alloys, Alloy Digest, Revised Jul. 1990, Published by Alloy Digest, Inc., 2 pp.
Colmonoy No. 6—Data on World Wide Metals and Alloys, Alloy Digest, Jan. 1963, Published by Engineering Alloys Digest, Inc., 2 pp.

* cited by examiner

THRUST PLATE FOR BUTTERFLY VALVE

BACKGROUND

This disclosure relates to a butterfly valve having a wear-resistant coating.

Butterfly valves are known and used to control air flow. A typical butterfly valve includes a housing that defines an air flow passage. A shaft is mounted in a housing and supports a butterfly disk. An actuator rotates the shaft to selectively open or close the butterfly disk to control the air flow through the passage in the housing.

SUMMARY

An exemplary thrust plate for a butterfly valve includes a thrust plate body that defines a recess. The recess extends between a bottom thrust surface, side walls and an open top. A wear-resistant coating is located on the bottom thrust surface.

An exemplary butterfly valve may include the thrust plate. The butterfly valve includes a valve housing that defines a flow passage there through. A shaft extends within the valve housing and includes a butterfly disk mounted thereon within the flow passage. An end of the shaft is received in the recess of the thrust plate.

An exemplary method of installing the thrust plate on the butterfly valve includes securing the thrust plate to the valve housing such that the end of the shaft is received into the recess of the thrust plate body.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
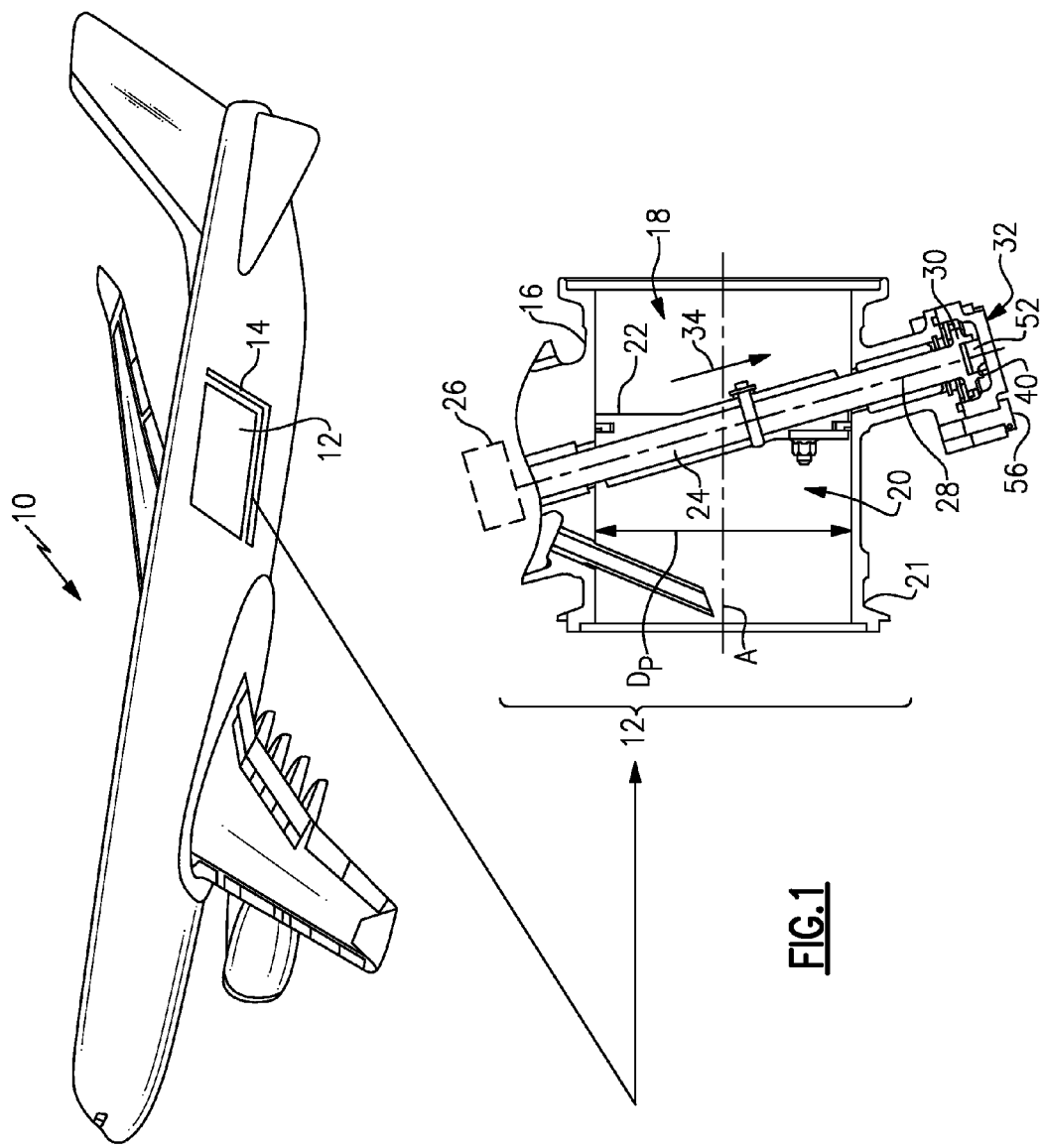
FIG. 1 illustrates an example aircraft that includes an air management system.

FIG. 1 illustrates selected portions of an example aircraft 10 that includes an air management system 12 mounted to a support 14 within the aircraft 10. The example air management system 12 includes a conduit 16 that defines a flow passage 18 along a central axis A for air flow.

A valve assembly 20 controls air flow through the flow passage 18. The valve assembly 20 includes a valve housing 21 that defines at least a portion of the flow passage 18. A butterfly disk 22 is mounted on a shaft 24 within the valve housing 21, and an actuator 26 (e.g., a pneumatic actuator) is operatively connected to the shaft 24 to move the butterfly disk 22 about a long axis 28 of the shaft 24. The shaft 24 includes an axial end 30 that is supported by a thrust plate 32. The thrust plate 32 limits movement of the shaft along the long axis 28.

The air management system 12 is required to operate at elevated temperatures, such as 1200° F. (649° C.), and high vibration levels with little or no lubrication. Furthermore, the long axis 28 of the shaft 24 is non-perpendicular to the central axis A and thereby produces a thrust load along the long axis 28 (indicated at 34). As will be described, the example thrust plate 32 includes a wear-resistant coating 40 at the interface with the axial end 30 of the shaft 24, to facilitate a reduction in friction and wear from the thrust load 34 that the shaft 24 exerts on the thrust plate 32.

Figure 2:
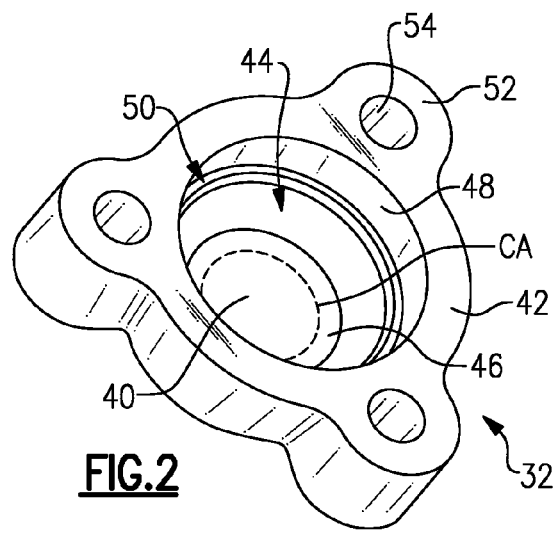
FIG. 2 is an isolated view of a thrust plate within a valve of the air management system.
Figure 3:
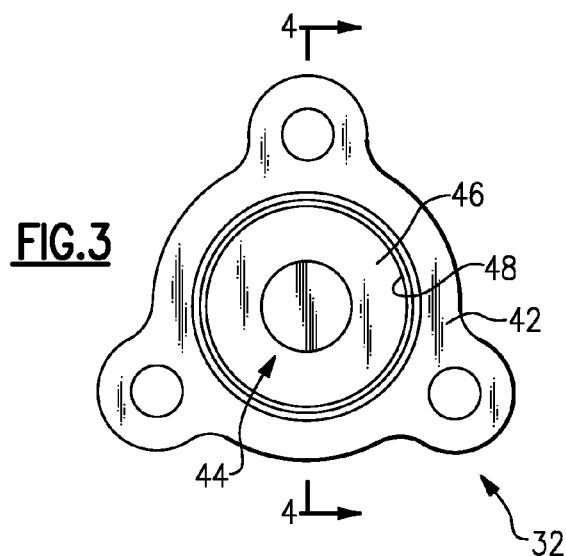
FIG. 3 is another view of the thrust plate of FIG. 2.
Figure 4:
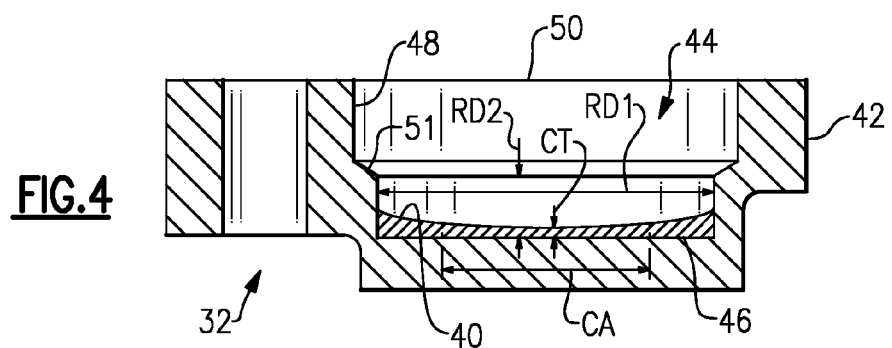
FIG. 4 is a cross-sectional view of the thrust plate shown in FIG. 3.

Referring to FIGS. 2-4, the thrust plate 32 is formed from a thrust plate body 42 that defines a recess 44 therein. The recess 44 generally extends between a bottom thrust surface 46, side walls 48 and an open top 50. As shown in FIG. 1, the axial end 30 of the shaft 24 is received into the recess 44 such that the axial end 30 contacts the bottom thrust surface 46. In that regard, the thrust plate body 42 includes a wear-resistant coating 40 on the bottom thrust surface 46 to resist wear between the thrust plate body 42 and the shaft 24 from the thrust load 34 produced during operation of the valve assembly 20.

In the example shown in FIG. 4, the recess 44 defines a recess diameter (RD1) and a recess depth (RD2). The recess depth extends between the bottom thrust surface 46 and a plane that is defined by a ledge or step 51 in the recess 44. In this example, the recess depth is taken from the lower portion of the step 51 at the location where the recess 44 narrows to the recess diameter.

The wear-resistant coating 40 also defines an average coating thickness (CT). For instance, the average coating thickness may be an average of thicknesses taken at selected locations across the wear-resistant coating 40.

In embodiments, the recess diameter (RD1) is 0.830-0.850 inches and may nominally be 0.840 inches. The recess depth (RD2) is 0.125-0.155 inches and may nominally be 0.140 inches. The coating thickness (CT) is 0.015-0.025 inches and may nominally be 0.020 inches.

In embodiments, the thrust plate 32 and wear-resistant coating 40 are designed with a ratio of RD1/CT that is between 33.2 and 56.67. In a further embodiment, the thrust plate 32 and wear-resistant coating 40 are also designed with a ratio of RD2/CT that is between 5 and 10.33. The selected ratios ensure that the wear-resistant coating 40 has a sufficient thickness to provide wear-resistance for a given recess size and also ensure that the wear-resistant coating 40 provides the proper axial positioning of the shaft 24.

The wear-resistant coating 40 is designed to be harder than the material of the thrust plate body 42 to thereby provide the wear-resistance. As an example, the material of the thrust plate body 42 may be an austenitic or precipitation hardened stainless steel. In other embodiments, the material of the thrust plate body 42 may be a nickel-based alloy, a cobalt-based alloy or steel. The nickel-based alloy may be Inconel® 625 or 718, the cobalt-based alloy may be Haynes 25, Stellite® 31 or Stellite® 60. The element that is the base element of the alloy refers to that element being present in a greater amount than any other element in the composition.

The material of the wear-resistant coating 40 is designed to protect the thrust plate body 42. In embodiments, the wear-resistant coating 40 is a nickel-based alloy or a cobalt-based alloy that is harder than the material of the thrust plate body 42. As an example, the nickel-based alloy may have a composition that essentially includes 0.5-1.0 wt. % carbon, 12-18 wt. % chromium, 2.5-4.5 wt. % boron, 3.5-5.5 wt. % silicon, 3.5-5.5 wt. % iron, up to 0.2 wt. % cobalt, and a remainder of nickel. The alloys may include impurities that do not affect the properties of the material or elements that are unmeasured or undetectable in the material.

The nickel-based alloy of the wear-resistant coating 40 may include hard compounds or phases that contribute to the high hardness of the wear-resistant coating 40. For instance, the hard compounds or phases may include chromium boride, chromium carbide, or both. The wear-resistant coating 40 may additionally include silicides. The borides, carbides, and/or silicides may be formed between the elements of the composition of the wear-resistant coating 40.

The flow passage 18 of the valve assembly 20 defines a diameter ($D_p$) (FIG. 1) and the shaft 24 contacts the wear-resistant coating 40 over an interface area (CA) (FIG. 4). A ratio $D_p$/CA determines the amount of thrust load 34 on the bottom thrust surface 46 of the thrust plate 32. In embodiments, the ratio $D_p$/CA is between 8 and 12.

The relative hardness of the wear-resistant coating 40 in comparison to the hardness of the material of the thrust plate body 42 is designed to provide a desired level of wear-resistance. For instance, a ratio of the hardness of the wear-resistant coating 40 to the hardness of the material of the thrust plate body 42 is at least 2.3. In a further example, the hardness of the wear-resistant coating 40 may be at least 55 HRC and the hardness of the material of the thrust plate body 42 may be a maximum of 23 HRC. The wear-resistant coating 40 thereby provides a sufficient level of wear-resistance with regard to the thrust load 34 that is expected from the given ratio $D_p$/CA.

The wear-resistant coating 40 resists wear such that during the operation of the valve assembly 20, the shaft 24 and butterfly disk 22 maintain a concentric position within the flow passage 18. The shaft 24 and butterfly disk 22 therefore do not shift position due to thrust plate 32 wear that could otherwise lead to binding and hindering of valve operation. That is, the absence of the wear-resistant coating 40 may otherwise lead to wear of the shaft 24 and/or of the bottom thrust surface 46 under the given thrust load 34 such that the shaft 24 and butterfly disk 22 shift in position and potentially hinder the operation of the valve.

Optionally, as shown in FIG. 1, the axial end 30 of the shaft 24 may include a plug 52 that is mounted in the axial end 30 for contact with the wear-resistant coating 40. The plug 52 may be formed of a hard material that resists wear.

In the illustrated example, the thrust plate 32 also includes a plurality of mounts 52 for securing the thrust plate 32 to the valve housing 21. In embodiments, the thrust plate 32 includes three such mounts 52 that are uniformly spaced around the periphery of the thrust plate 32. As an example, each of the mounts 52 includes an opening 54 therein for receiving a bolt 56 (FIG. 1) to secure the thrust plate 32 to the valve housing 21.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A thrust plate for a butterfly valve, the thrust plate comprising:
    a thrust plate body defining a recess that extends between a bottom thrust surface, side walls and an open top; and
    a wear-resistant coating located on the bottom thrust surface, the wear-resistant coating consisting essentially of 0.5-1.0 wt. % carbon, 12-18 wt. % chromium, 2.5-4.5 wt. % boron, 3.5-5.5 wt. % silicon, 3.5-5.5 wt. % iron, up to 0.2 wt. % cobalt, and a remainder of nickel, wherein the hardness of the wear-resistant coating is greater than the hardness of the thrust plate body.

2. The thrust plate as recited in claim 1, wherein the wear-resistant coating includes chromium boride.

3. The thrust plate as recited in claim 1, wherein the wear-resistant coating includes chromium carbide.

4. The thrust plate as recited in claim 1, wherein the thrust plate body is a material selected from a group consisting of nickel-based alloy, cobalt-based alloy and steel.

5. The thrust plate as recited in claim 1, wherein the thrust plate body, with the exception of the bottom thrust surface, is free of the wear-resistant coating.

6. The thrust plate as recited in claim 1, wherein the recess defines a recess diameter (RD1) and the wear-resistant coating defines an average coating thickness (CT), and ratio RD1/CT is between 33.2 and 56.67.

7. The thrust plate as recited in claim 1, wherein the recess defines a recess depth (RD2) and the wear-resistant coating defines an average coating thickness (CT), and a ratio RD2/CT is between 5 and 10.33.

8. The thrust plate as recited in claim 1, wherein the recess defines a recess depth (RD2) and the wear-resistant coating defines an average coating thickness (CT), and a ratio RD2/CT is between 5 and 10.33, and the recess depth is taken from a step in the recess to the bottom surface.

9. The thrust plate as recited in claim 1, wherein the thrust plate body is stainless steel.

10. The thrust plate as recited in claim 9, wherein a ratio of a hardness, in Rockwell C, of the wear-resistant coating to a hardness, in Rockwell C, of the stainless steel is at least 2.3.

11. The thrust plate as recited in claim 1, wherein the recess includes a step therein.

12. The thrust plate as recited in claim 11, wherein the step is sloped with respect to the bottom thrust surface and the side walls.

13. A butterfly valve comprising:
    a valve housing defining a flow passage there through;
    a shaft extending in the valve housing and including a butterfly disk mounted thereon within the flow passage;
    a thrust plate including a thrust plate body defining a recess that receives an end of the shaft, and the recess extends between a bottom thrust surface, side walls and an open top; and
    a wear-resistant coating located on the bottom thrust surface, wherein the recess defines a recess diameter (RD1) and the wear-resistant coating defines an average coating thickness (CT), and ratio RD1/CT is between 33.2 and 56.67.

14. The butterfly valve as recited in claim 13, wherein the flow passage defines a central axis, and a long axis of the shaft is non-perpendicular to the central axis.

15. The butterfly valve as recited in claim 13, wherein the flow passage defines a diameter ($D_p$) in inches and the shaft contacts the wear-resistant coating over an interface area (CA) in square inches such that a ratio of $D_p$/CA is between 8 and 12 in/in$^2$.

16. The butterfly valve as recited in claim 13, wherein the recess defines a recess depth (RD2) and the wear-resistant coating defines an average coating thickness (CT) such that a ratio RD2/CT is between 5 and 10.33.

17. The butterfly valve as recited in claim 13, wherein the thrust plate body is stainless steel and the wear-resistant coating is selected from a group consisting of a nickel-based alloy and a cobalt-based alloy.

18. The butterfly valve as recited in claim 13, wherein wear-resistant coating consists essentially of 0.5-1.0 wt. % carbon, 12-18 wt. % chromium, 2.5-4.5 wt. % boron, 3.5-5.5 wt. % silicon, 3.5-5.5 wt. % iron, up to 0.2 wt. % cobalt, and a remainder of nickel.

19. The butterfly valve as recited in claim 13, wherein an end of the shaft contacts the wear-resistant coating.

20. The butterfly valve as recited in claim 19, wherein the flow passage defines a central axis, and a long axis of the shaft is non-perpendicular to the central axis such that the shaft is operable to produce a thrust load directed into the recess.

21. A method of installing a thrust plate on a butterfly valve, the method comprising:

securing a thrust plate to a valve housing that defines a flow passage there through such that an end of a shaft, which extends within the valve housing and includes a butterfly disk mounted thereon, is received into a recess of the thrust plate body, the recess extends between a bottom thrust surface, side walls and an open top, and the bottom thrust surface includes a wear-resistant coating thereon, the wear-resistant coating consisting essentially of 0.5-1.0 wt. % carbon, 12-18 wt. % chromium, 2.5-4.5 wt. % boron, 3.5-5.5 wt. % silicon, 3.5-5.5 wt. % iron, up to 0.2 wt. % cobalt, and a remainder of nickel.

22. The method as recited in claim 21, including contacting the end of the shaft with the wear-resistant coating.

23. The method as recited in claim 21, wherein the securing of the thrust plate to the valve housing includes bolting the thrust plate to the housing.

24. The method as recited in claim 21, wherein the flow passage defines a diameter ($D_p$) and the shaft contacts the wear-resistant coating over an interface area (CA) such that a ratio of $D_p$/CA is between 8 and 12.

* * * * *